US010209745B2

(12) United States Patent
Evans et al.

(10) Patent No.: US 10,209,745 B2
(45) Date of Patent: Feb. 19, 2019

(54) INPUT DEVICES AND METHODS OF MANUFACTURING

(71) Applicant: Microsoft Technology Licensing, LLC, Redmond, WA (US)

(72) Inventors: Ryan Travis Evans, Bellevue, WA (US); Bernard Maurice Schultz, III, Bothell, WA (US); Ian Howe Lewis, Kenmore, WA (US); Lars Tuborg Jensen, Redmond, WA (US); John Charles Meyer, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/692,515

(22) Filed: Aug. 31, 2017

(65) Prior Publication Data

US 2018/0314301 A1 Nov. 1, 2018

Related U.S. Application Data

(60) Provisional application No. 62/492,438, filed on May 1, 2017.

(51) Int. Cl.
*H05K 5/00* (2006.01)
*G06F 1/16* (2006.01)
*G06F 3/02* (2006.01)

(52) U.S. Cl.
CPC .......... *G06F 1/1662* (2013.01); *G06F 3/0202* (2013.01)

(58) Field of Classification Search
CPC ........................................................ H05K 7/00
USPC .................................................... 361/679.01
See application file for complete search history.

(56) References Cited

U.S. PATENT DOCUMENTS 8,851,771 B2 10/2014 Kaliebe et al.
9,583,285 B1 2/2017 Andre et al.
2011/0292579 A1* 12/2011 Koga .................... G06F 1/1616
361/679.01

(Continued)

FOREIGN PATENT DOCUMENTS

CN 1372286 A 10/2002
EP 2043120 A1 4/2009

OTHER PUBLICATIONS

"Surface Pro Signature Type Cover", https://web.archive.org/web/20170527061634/https://www.microsoft.com/en-us/surface/accessories/surface-pro-signature-type-cover, Published on: May 27, 2017, 12 pages.

(Continued)

*Primary Examiner* — Jerry Wu
(74) *Attorney, Agent, or Firm* — Ray Quinney & Nebeker P.C.; Paul N. Taylor (57) ABSTRACT

An input device is described. The input device may include at least four key caps of a keyset and a keyboard cover surrounding the at least four key caps. Each key cap of the at least four key caps may be separated by at least one gap. The at least one gap may be between 0.075 mm and 0.525 mm. A method of manufacturing an input device is described. The method may include measuring at least four keycaps in a keyset. Each key cap of the at least four key caps may be separated on a side from a keyboard cover by a gap. The method may include cutting a substrate to fit between the at least four keycaps in the keyset such that the gap of each of the at least four keys is between 0.075 mm and 0.525 mm.

19 Claims, 5 Drawing Sheets

(56) References Cited

U.S. PATENT DOCUMENTS

2013/0228435 A1* 9/2013 Whitt, III ............ H01H 13/704
                                                     200/5 A
2015/0270076 A1    9/2015  Katsuhara et al.
2016/0049266 A1    2/2016  Stringer et al.
2016/0071664 A1    3/2016  Cohen et al.
2016/0307714 A1   10/2016  Bhate et al.

OTHER PUBLICATIONS

"2017 iPad Mini 1/2 /3 360 Rotatable Keyboard Case, New Style Keyboard Cover Case with Bluetooth Connectivity for Apple iPad Mini 1/ 2/3retina", https://www.wish.com/c/58b7f1af1604f85a2aceb6b8, Retrieved on: Jun. 21, 2017, 1 page.

"Keys-To-Go-Logitech", https://web.archive.org/web/20151103145019/http:/www.logitech.com/en-us/product/keys-to-go?crid=1221, Published on: Nov. 3, 2015, 4 pages.

Daniel, "iPad 2 Silicone Keyboard Cover", http://gadgetsin.com/ipad-2-silicone-keyboard-cover.htm, Published on: Jan. 4, 2012, 5 pages.

"International Search Report and Written Opinion Issued in PCT Application No. PCT/US18/028460", dated Jul. 16, 2018, 14 Pages.

\* cited by examiner

INPUT DEVICES AND METHODS OF MANUFACTURING

CROSS-REFERENCE TO RELATED APPLICATIONS

This application claims the benefit of and priority to U.S. Provisional Patent Application No. 62/492,438, filed on May 1, 2017, which is hereby incorporated by reference in its entirety.

BACKGROUND

Background and Relevant Art

Use of computing devices is becoming more ubiquitous by the day. Computing devices range from standard desktop computers to wearable computing technology and beyond. One area of computing devices that has grown in recent years is the hybrid computers. Hybrid computers may act as a tablet computer or a laptop computer. Many hybrid computers include input devices that may be separated from the screen.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

In one embodiment, an input device is described. The input device includes at least four key caps of a keyset and a keyboard cover surrounding the at least four key caps. Each key cap of the at least four key caps is separated by at least one gap. The at least one gap may be between 0.075 mm and 0.525 mm.

In one embodiment, a method of manufacturing an input device is described. The method includes measuring at least four keycaps in a keyset. Each key cap of the at least four key caps is separated on a side from a keyboard cover by a gap. The method includes cutting a substrate to fit between the at least four keycaps in the keyset such that the gap of each of the at least four keys is between 0.075 mm and 0.525 mm.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIGS. 10-1 through 10-3 illustrate an embodiment of a method of manufacturing an input device.

DETAILED DESCRIPTION

This disclosure generally relates to input devices and methods of manufacturing the same. More particularly, this disclosure generally relates to input devices with covers having small gaps and methods for cutting a cover to have such small gaps.

At least one embodiment of an input device or method of manufacturing disclosed herein facilitates smaller and/or more consistent gaps around a perimeter of individual keys on a keyboard which may improve aesthetics. At least one embodiment of an input device or method of manufacturing described herein facilitates supporting structures with increased size to improve stiffness by reducing gap variations between keys. At least one embodiment of an input device or method of manufacturing disclosed herein has uniform gaps around individual keysets on a keyboard. Improved optics may allow for more accurate measurements of variations between keys.

Figure 1:
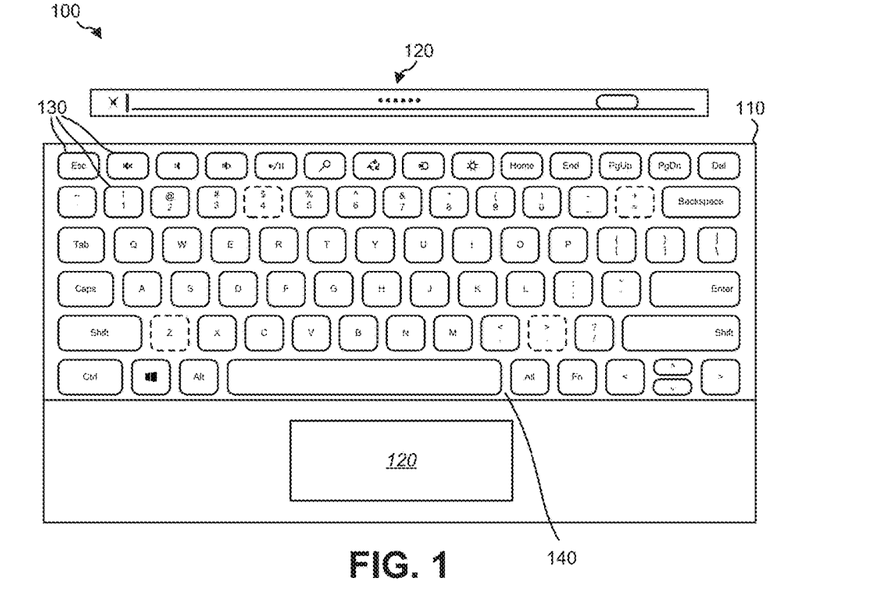
FIG. 1 is a top view of an embodiment of an input device.

FIG. 1 is a top view of an embodiment of an input device 100. The input device 100 may be connected to a computing device (not shown). For example, the input device 100 may be connected to a display, a tablet, a desktop, a phone, or other computing devices via a connector 102. The input device 100 may include one or more input sources. In the present embodiment, the input device 100 is a keyboard. The input device 100 may include a keyset 110 and/or a touchpad 120. In other embodiments, other input sources may be used.

Figure 4:
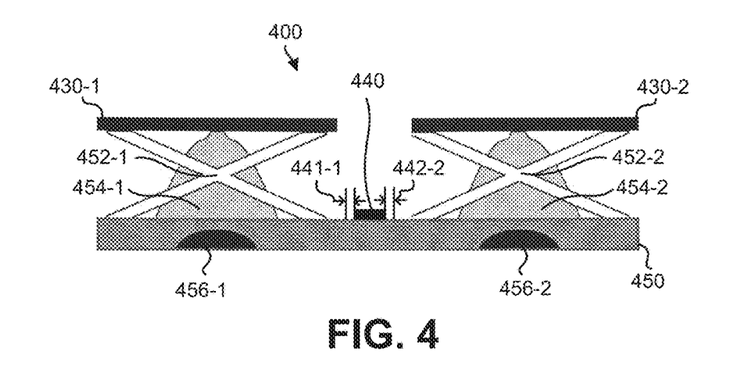
FIG. 4 is a schematic cutaway side view of an embodiment of an input device showing two keycaps.

The keyset 110 includes a plurality of keycaps 130. Keycaps 130 may include any type of keycap. For example, keycaps 130 may have a key surface that may be flat (as shown in FIG. 4), curved, or both. The keycaps 130 may be labeled, as shown.

The keycaps 130 may arranged within the keyset 110. The keyset 110 may include any number of keycaps 130. As shown, the keyset 110 includes seventy-seven keycaps 130. In other embodiments, more ore fewer keycaps 130 may be included in the keyset 110. For example, a keyset 110 may include seventy-eight keycaps 130.

The keycaps 130 may be surrounded by a cover 140. In some embodiments, the touchpad 120 may be at least partially surrounded by the cover 140. The cover 140, in FIG. 1, is a keyboard cover. The cover 140 may include one or more materials. For example, the cover 140 may be made of fabric. The fabric may include Alcantara material. As shown in FIG. 1, the cover 140 may extend to the edges of the input device 100. The input device 100 may include a support structure (not shown) beneath the keyset 110. The cover 140 may extend beyond the edges of the support structure and may be adhered to another cover (not shown) on the rear of the input device 100. The cover 140 may for formed from a single, unbroken piece of material. For example, the cover 140 may be a whole piece of fabric with cuts for the keycaps 130.

Figure 2:
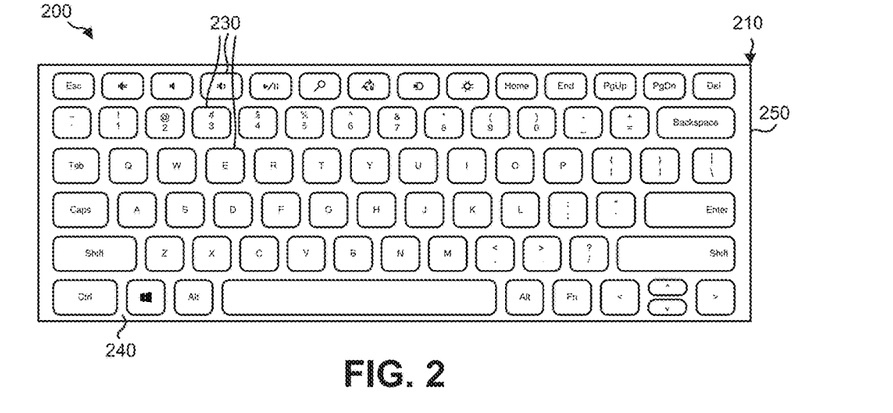
FIG. 2 is a top view of another embodiment of an input device.

FIG. 2 is a top view of another embodiment of an input device 200. The input device 200 is similar to the input device 100 in FIG. 1. To facilitate description, like numerals represent like components. The input device 200 may include a keyset 210 with keycaps 230 and a cover 240. The input device 200 includes a support structure 250 that extends to the edge of the input device 200. The cover 240 may extend near, to, or beyond the support structure 250. In contrast to the input device 100 of FIG. 1, the cover 240 may be bonded directly to the support structure 250.

Figure 3:
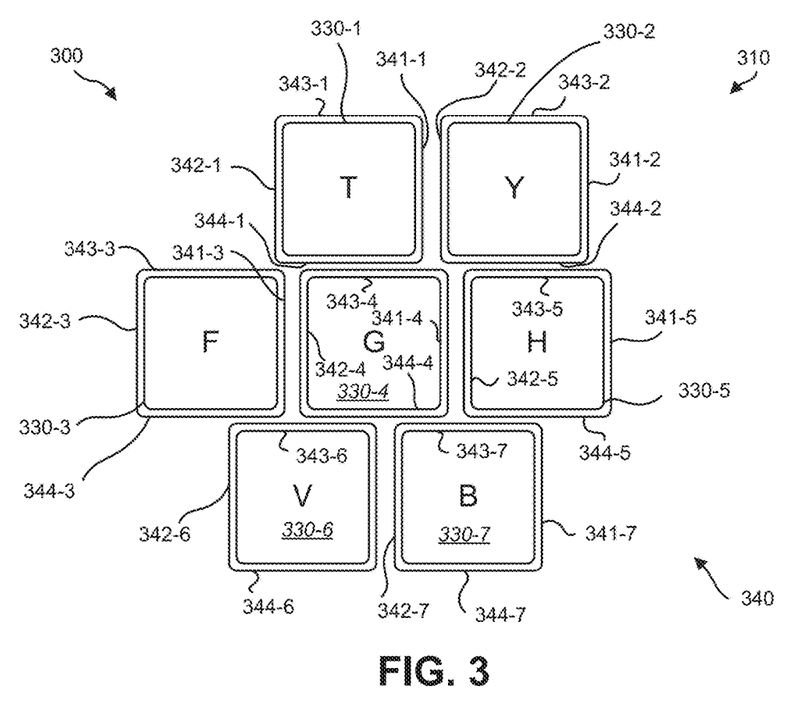
FIG. 3 is a partial cutaway view of further embodiment of an input device

FIG. 3 is a partial cutaway view of further embodiment of an input device 300. To facilitate description, like numerals represent like components. The input device 300 is shown with a keyset 310 with seven keycaps 330 and a cover 340. The keycaps 330 are surrounded on all sides by the cover 340. The cover 340 has a plurality of gaps around each keycap 330. The gaps may be between an edge of the keycap 330 and the cover 340.

Referring briefly to FIG. 4, a schematic cutaway side view of an embodiment of an input device 400 showing two keycaps 430. The keycaps 430 may be supported over a support structure 450 by a support mechanism 452 (e.g., hinge). The keycaps 430 may provide input through an input receiver 454 (e.g., a cup). The input receiver 454 may be in electronic communication with a processor (not shown) via an electronic connection 456.

As the keycap 430 is pressed, the support mechanism 452 may depress allowing the keycap 430 to depress the input receiver 454. A portion of a cover 440 may extend between a first and second keycap 430-1, 430-2. The right side of the first keycap 430-1 is separated from the cover 440 by a right gap 441-1. The left side of the second keycap 430-2 is separated from the cover by a left gap 442-2.

Without the gaps (e.g., right gap 441-1 and left gap 442-2), the keycaps 430 may contact the cover 440. Contacting the cover 440 may affect the ability of the input receiver 454 to report an attempted keystroke to a processor. If too large of a gap is included, then the aesthetics of the input device 400 may be diminished. As keysets (e.g., keyset 110, 210, 310) get smaller and keycaps 430 come closer together, the size of the gaps may decrease and/or the width of the cover 440 between keycaps 430 may increase.

Furthermore, although it may be desirable for keycaps (e.g., keycaps 130, 230, 330, 430, 530) to be accurately spaced, keysets (e.g., keysets 110, 210, 310, 410, 510) generally vary from nominal values because of, for example, variations in keycap size, support mechanism design/size, connections with the support structure, etc. Thus, simply cutting a cover (e.g., covers 120, 220, 320, 420, 520) that will fit an entire keyset may only be possible with very large gaps.

Referring back to FIG. 3, the keyset 310 is shown with seven keysets 330 highlighted. The fourth keycap 330-4 is surrounded by the first keycap 330-1, the second keycap 330-2, the third keycap 330-3, the fifth keycap 330-5, the sixth keycap 330-6, and the seventh keycap 330-7. The fourth keycap 330-4 includes a right gap 341-4 between the right side of the fourth keycap 330-4 and the cover 340, a left gap 342-4 between the left side of the fourth keycap 330-4 and the cover 340, a top gap 341-4 between the top side of the fourth keycap 330-4 and the cover 340, and a bottom gap 342-4 between the bottom side of the fourth keycap 330-4 and the cover 340. The other keycaps 330 include left, right, top, and bottom gaps 341, 342, 343, 344, respectively.

Figure 5:
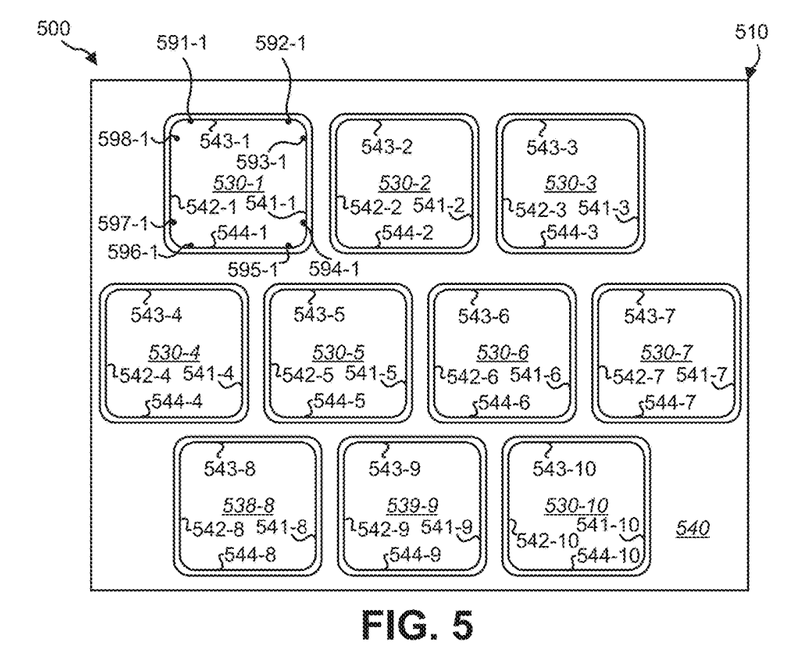
FIG. 5 is a schematic top view of an embodiment of an input device.

FIG. 5 is a schematic top view of an embodiment of an input device 500. To facilitate description, like numerals represent like components. The input device 500 includes a keyset 510 with ten keycaps 530 and a cover 540. The keycaps 530 are surrounded by the cover 540. The cover 540 has a plurality of gaps (e.g., right gaps 541, left gaps 542, top gaps 543, and bottom gaps 544) around each keycap 530.

As the gaps (e.g., right gap 541, left gaps 542, top gaps 543, and bottom gaps 544) get smaller, the risk of the cover 540 impinging on the movement of one or more of the ten keycaps 530 with their forty gaps (e.g., 10 times 4=40) increases.

Referring back to FIG. 2, as the gaps (e.g., right gap 541, left gaps 542, top gaps 543, and bottom gaps 544) get smaller, the risk of the cover 240 impinging on the movement of one or more of the seventy-seven keycaps 230 with their three hundred and eight gaps (e.g., 77 times 4=308) increases.

Although the embodiments described include gaps on all four sides of each keycap, one or more keycaps may have fewer than four gaps. For example, with reference to the input device 200 FIG. 2, the cover 240 may not surround the keycaps 230 on the top row (e.g., "Esc", mute, volume down, volume up, "Del"). In other words, the top row of keycaps 230 may not have top gaps because the cover 240 may surround less than all four sides of the keycaps 230.

As described above, the cover may be made of a single, unbroken piece of material. As the gaps get smaller and the number of keycaps increase, the ability to place a cover over the keycaps while still maintaining desired gaps becomes more difficult.

The gaps around one or more of the keycaps may have a nominal value and/or a tolerance. In at least one embodiment, two, three, four, five, six, eight, ten, twenty, forty, sixty, eighty keycaps of a single input device, or any value therebetween have a gap with a nominal value of 0.175 mm, 0.2 mm, 0.25 mm, 0.3 mm, 0.4 mm, 0.5 mm, or any value therebetween. In at least one embodiment, two, three, four, five, six, eight, ten, twenty, forty, sixty, eighty keycaps of a single input device, or any value therebetween have a gap with a tolerance gap of between 0.25 mm, 0.3 mm, 0.35 mm, 0.4 mm, 0.45 mm, 0.5 mm or any value therebetween. In at least one embodiment, two, three, four, five, six, eight, ten, twenty, forty, sixty, eighty keycaps of a single input device, or any value therebetween have a gap of between one or more of 0.125 mm, 0.2 mm, 0.25 mm, 0.3 mm, 0.4 mm, 0.5 mm, or any value therebetween.

Figure 6:
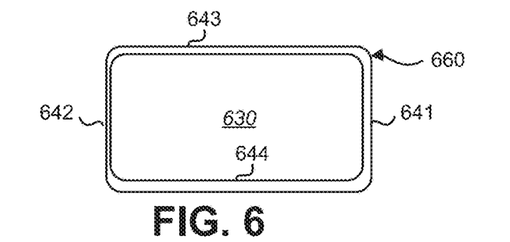
FIGS. 6-9 are schematic top views of various embodiments of a keycap with four gaps.
Figure 7:
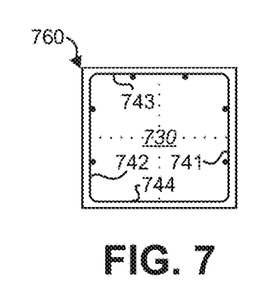
Figure 8:
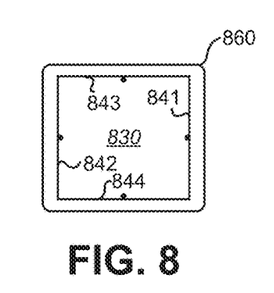
Figure 9:
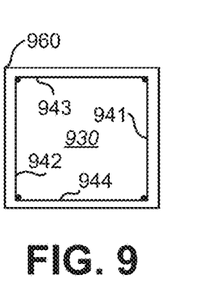

FIGS. 6-9 are schematic top views of various embodiments of keycaps with four gaps. FIG. 6 is a rectangular elongated keycap 630 with rounded corners inside a round aperture 660 in the cover (not shown) with a right gap 641, a left gap 642, a top gap 643, and a bottom gap 644. The gaps 641, 642, 643, 644 may be even about the perimeter of the keycap 630. FIG. 7 is a square keycap 730 with rounded corners inside a square aperture 780 in the cover (not shown) with a right gap 741, a left gap 742, a top gap 743, and a bottom gap 744. The gaps 741, 742, 743, 744 may be even along the edges of the keycap 730 while the gaps 741, 742, 743, 744 may be uneven at the corners relative to the edges. FIG. 8 is a square keycap 830 inside a square aperture 860 in the cover (not shown) with rounded corners with a right gap 841, a left gap 842, a top gap 843, and a bottom gap 844. The gaps 841, 842, 843, 844 may be even along the edges of the keycap 830 while the gaps 841, 842, 843, 844 may be uneven at the corners relative to the edges. FIG. 9 is a square keycap 930 inside a square aperture 960 in the cover (not shown) with a right gap 941, a left gap 942, a top gap 943, and a bottom gap 944. The gaps 941, 942, 943, 944 may be even along the edges and the corner of the keycap 930 (e.g., about the perimeter of the keycap 930).

Figure 101:
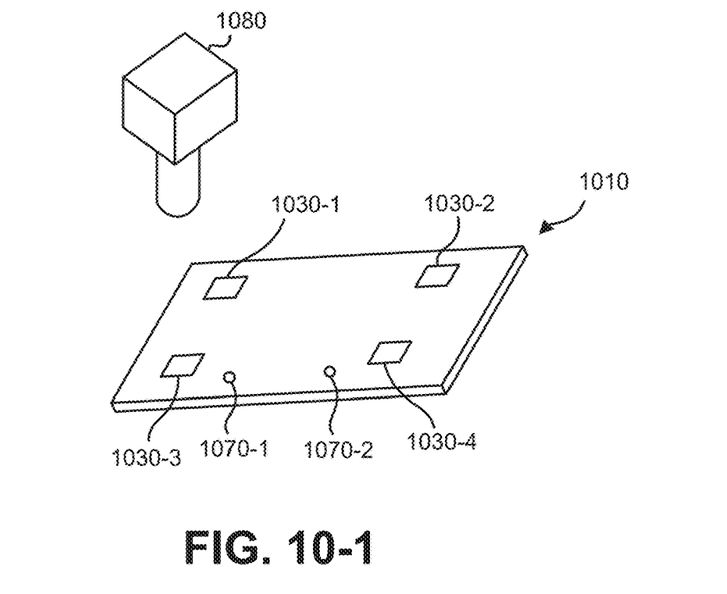
Figure 102:
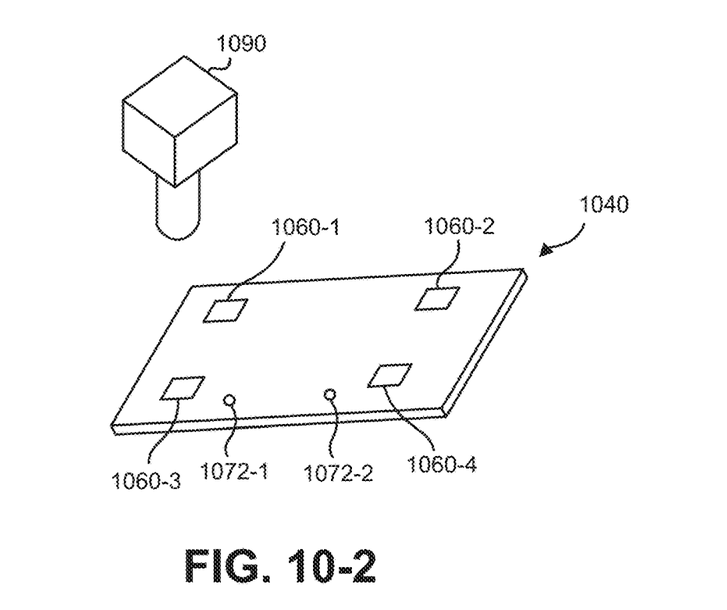
Figure 103:
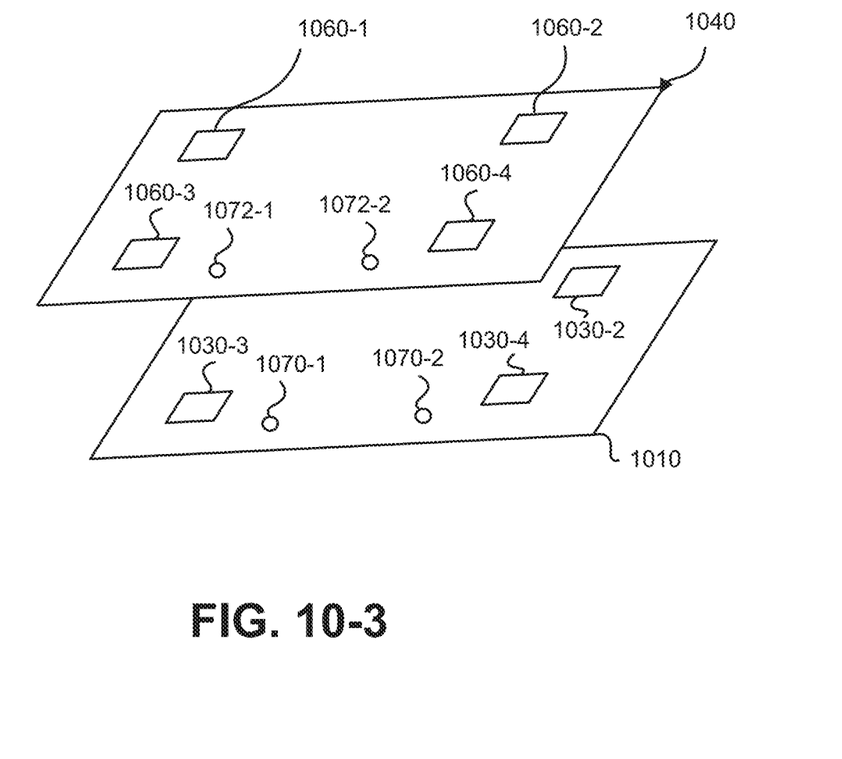

FIGS. 10-1 through 10-3 illustrate an embodiment of a method of manufacturing an input device. FIG. 10-1 illustrates an embodiment of a keyset 1010 with a plurality of keycaps 1030. For ease of description, four keycaps 1030-1, 1030-2, 1030-3, 1030-4 are used. The keyset 1010 may include one or more datum points 1070. The method includes using a measuring device 1080 to determine (e.g., measure) the position and/or location of each keycap 1030. The measuring device 1080 may include an optical camera, an infrared camera, other cameras, or combinations thereof. In one embodiment, the measuring device 1080 may include a twenty-five megapixel camera.

The measuring device 1080 may be connected to a numerically controlled system for guiding the measuring device 1080 relative to the keyset 1010. The measuring device 1080 determines one or more points of one or more keycaps. As shown in FIG. 5, the first keycap 530-1 includes eight points 591-598. Each point 591-598 is located at an end of each edge (e.g., at the transition from the edge to a rounded corner). As shown in FIG. 7, the eight points are equally spaced about the midlines of each edge. One or more of the points may be a certain percent of the length of the edge from each corner. For example, as shown in FIG. 7, the eight points each may be 25% of the length of the edge away from the corner. As shown in FIG. 8, each point is at the midpoint of each edge. As shown in FIG. 9, each point is at the corner of the keycap. In other embodiments, the points may be unevenly spaced, may vary in position and location about the perimeter, may vary in number at each edge, may be otherwise positioned, or combinations thereof. The measuring device 1080 may measure one or more datum points 1070 of the keyset 1010.

The same or a different measuring device 1080 may measure one or more datum points 1072 of the cover 1040. As shown in FIG. 10-2, the measuring device 1080 may be replaced with a cutting device 1090. The cutting device 1090 may cut one or more apertures 1060. In other embodiments, the measuring device 1080 and the cutting device 1090 may be the same.

The method may include measuring two, three, four, five, six, eight, ten, twenty, forty, sixty, eighty keycaps, of a single input device, or any value therebetween. The measured keycaps may not necessarily be adjacent. For example, two or more of the measured keycaps may be separated by a plurality of keycaps. As shown in FIG. 1, four keys are highlighted (in phantom), the "Z", "4", "+", and "." keycaps may be measured.

FIG. 10-3 illustrates how the method may include aligning the keyset 1010 and cover 1040. Aligning the keyset 1010 and cover 1040 may include aligning one or more datum points (e.g., datum points 1070, 1072). With the keyset 1010 and the cover 1040 aligned, the keyset 1010 and the cover 1040 may be fastened together. For example, the keyset 1010 and the cover 1040 may be heat staked together.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An input device, comprising: at least four key caps of a keyset; a keyboard cover surrounding the at least four key caps; each key cap of the at least four key caps being separated horizontally on a right side from the keyboard cover by a right horizontal gap; each key cap of the at least four key caps being separated horizontally on a left side from the keyboard cover by a left horizontal gap; and a substrate to fit between the at least four key caps in the keyset such that wherein the right horizontal gap and the left horizontal gap are between 0.125 mm and 0.475 mm; the substrate is cut after measuring and aligning with the at least four key caps in the keyset, each of the at least four key caps includes one or more datum points located at each edge for measuring, cutting, and aligning.

2. The input device of claim 1, further comprising a fifth key cap of the keyset vertically adjacent to the at least four key caps, where the fifth key cap is separated on a top side from the keyboard cover by the top horizontal gap, on a bottom side from the keyboard cover by the bottom horizontal gap.

3. The input device of claim 1, wherein each key cap of the at least four key caps is separated horizontally on a top side from the keyboard cover by a top horizontal gap.

4. The input device of claim 3, wherein each key cap of the at least four key caps is separated horizontally on a bottom side from the keyboard cover by a bottom horizontal gap.

5. The input device of claim 1, wherein each key cap of the at least four key caps is moveable.

6. The input device of claim 1, wherein the keyboard cover is fabric.

7. An input device, comprising: at least ten key caps of a keyset, each of the ten key caps being adjacent at least one other of the ten key caps; a keyboard cover surrounding the at least ten key caps, wherein the keyboard cover is fabric; each key cap of the at least ten key caps being separated horizontally on a right side from the keyboard cover by a right horizontal gap; each key cap of the at least ten key caps being separated horizontally on a left side from the keyboard cover by a left horizontal gap; each key cap of the at least ten key caps being separated horizontally on a top side from the keyboard cover by a top horizontal gap; each key cap of the at least ten key caps being separated horizontally on a bottom side from the keyboard cover by a bottom horizontal gap; and a substrate to fit between the at least ten key caps in the keyset such that wherein the right horizontal gap, the left horizontal gap, the top horizontal gap, and the bottom horizontal gap are between 0.075 mm and 0.525 mm; the substrate is cut after measuring and aligning with the at least ten key caps in the keyset, each of the at least ten key caps includes one or more datum points located at each edge for measuring, cutting, and aligning.

8. A method of manufacturing an input device, comprising: measuring at least four key caps in a keyset, each key cap of the at least four key caps being separated on a right side from a keyboard cover by a right gap, each key cap of the at least four key caps being separated on a left side from the keyboard cover by a left gap; and cutting a substrate to fit between the at least four key caps in the keyset such that the right gap and the left gap of each of the at least four keys are between 0.075 mm and 0.525 mm; the substrate is cut after measuring and aligning with the at least four key caps in the keyset, each of the at least four key caps includes one or more datum points located at each edge for measuring, cutting, and aligning.

9. The method of claim 8, wherein measuring the at least four key caps in the keyset further comprises measuring at least four points per key cap.

10. The method of claim 9, wherein the at least four points are located on different sides of each key cap.

11. The method of claim 8, wherein measuring the at least four key caps in the keyset further comprises measuring at least eight points per key caps.

12. The method of claim 11, wherein the at least eight points are in four pairs, and wherein each pair of the four pairs are located on different sides of each key cap.

13. The method of claim 11, wherein the at least eight points are in four pairs, and wherein a first key cap of a first pair of the four pairs is located within 5% of a corner of the key cap.

14. The method of claim 13, wherein the at least eight points are in four pairs, and wherein a second key cap of a first pair of the four pairs is located within 5% of a corner of the key cap.

15. The method of claim 14, wherein the at least eight points are in four pairs, wherein a third key cap of a second pair of the four pairs is located within 5% of a corner of the key cap, and wherein a fourth key cap of a second pair of the four pairs is located within 5% of a corner of the key cap.

16. The method of claim 11, wherein the at least eight points are in four pairs, and wherein a first key cap of a first pair of the four pairs is located within 25% of a corner of the key cap.

17. The method of claim 8, wherein cutting the substrate includes cutting the substrate to fit between the at least four keycaps in the keyset such that the right gap and the left gap of each of the at least four keys are between 0.125 mm and 0.475 mm.

18. The method of claim 8, further comprising aligning the keyset and the cut cover.

19. The method of claim 18, wherein aligning the keyset and the cut cover includes aligning one or more datum points on the keyset with one or more datum points on the cover.

* * * * *

UNITED STATES PATENT AND TRADEMARK OFFICE
CERTIFICATE OF CORRECTION

| | |
|---|---|
| PATENT NO. | : 10,209,745 B2 |
| APPLICATION NO. | : 15/692515 |
| DATED | : February 19, 2019 |
| INVENTOR(S) | : Ryan Travis Evans et al. |

It is certified that error appears in the above-identified patent and that said Letters Patent is hereby corrected as shown below:

In the Specification

Column 3
Line 3 change "Alcantara material" to --ALCANTARA® material--

Signed and Sealed this
Twelfth Day of July, 2022

Katherine Kelly Vidal
Director of the United States Patent and Trademark Office